US 6,615,683 B1

(12) United States Patent
Voigt

(10) Patent No.: US 6,615,683 B1
(45) Date of Patent: Sep. 9, 2003

(54) GEAR DRIVE

(75) Inventor: Dieter Voigt, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/018,982

(22) PCT Filed: May 11, 2000

(86) PCT No.: PCT/EP00/04271

§ 371 (c)(1),
(2), (4) Date: Dec. 18, 2001

(87) PCT Pub. No.: WO01/01021

PCT Pub. Date: Jan. 4, 2001

(30) Foreign Application Priority Data

Jun. 24, 1999 (DE) .......................... 199 28 960

(51) Int. Cl.⁷ .............................................. F16H 55/18
(52) U.S. Cl. ............................ 74/440; 74/409; 74/406; 74/439; 74/395
(58) Field of Search ........................ 74/409, 406, 411, 74/440, 410, 439, 395

(56) References Cited

U.S. PATENT DOCUMENTS

| | | | | | |
|---|---|---|---|---|---|
| 1,197,261 A | * | 9/1916 | Burke | .......................... | 74/440 |
| 1,215,949 A | * | 2/1917 | Masson | ...................... | 74/517 |
| 1,449,903 A | * | 3/1923 | Leow | .......................... | 74/440 |
| 1,539,149 A | * | 5/1925 | Thornburg | ................... | 74/440 |
| 1,558,222 A | * | 10/1925 | Beetow | ...................... | 74/440 |
| 1,564,160 A | * | 12/1925 | Wegert | ...................... | 74/440 |
| 2,845,809 A | * | 8/1958 | Hetzel | ......................... | 74/440 |
| 2,966,806 A | * | 1/1961 | Luning | ....................... | 74/409 |
| 3,020,775 A | | 2/1962 | Musser | | |
| 3,127,784 A | * | 4/1964 | O'Neill | ...................... | 74/440 |
| 3,296,881 A | * | 1/1967 | Seabeck | ..................... | 74/440 |
| 3,359,819 A | * | 12/1967 | Veillette | ..................... | 74/409 |
| 3,385,126 A | * | 5/1968 | Finch | ........................... | 74/440 |
| 3,407,727 A | * | 10/1968 | Fischer | ....................... | 101/177 |
| 4,408,526 A | * | 10/1983 | Mathes | ....................... | 101/216 |
| 4,696,201 A | * | 9/1987 | Hattori et al. | ................. | 74/467 |
| 4,745,823 A | * | 5/1988 | Morita et al. | ................. | 74/409 |
| 4,781,073 A | * | 11/1988 | Bondhus et al. | ............. | 74/440 |
| 5,031,531 A | * | 7/1991 | Becker | ....................... | 101/230 |
| 5,056,613 A | * | 10/1991 | Porter et al. | ................. | 180/178 |
| 5,802,920 A | * | 9/1998 | Becker | ......................... | 74/439 |
| 5,964,150 A | * | 10/1999 | Kato et al. | ................... | 101/216 |
| 6,006,622 A | | 12/1999 | Bischof et al. | | |

FOREIGN PATENT DOCUMENTS

| | | |
|---|---|---|
| DE | 43 26 155 | 2/1994 |
| DE | 197 21 852 | 12/1999 |
| JP | 1-153865 | 9/1989 |

* cited by examiner

Primary Examiner—Jack Lavinder
Assistant Examiner—Benjamin A. Pezzlo
(74) Attorney, Agent, or Firm—Ostrolenk, Faber, Gerb & Soffen, LLP

(57) ABSTRACT

A gear drive, including a first shaft, a first gear wheel on the first shaft, a second shaft a certain distance away from the first shaft, and a second gear on the second shaft. The second gear wheel engaged with the first gear wheel by way of helical gearing. A third gear wheel is mounted on the second shaft a certain axial distance away from the second gear wheel to compensate for backlash. The third gear wheel also engages with the first gear wheel by way of helical gearing and being axially shiftable with respect to the second gear wheel. An expansion element is arranged so as to change a distance between the second gear wheel and the third gear wheel as a function of temperature. The expansion element has a thermal expansion selected so that, when the expansion element undergoes thermal expansion, the expansion element shifts the third gear wheel in an axial direction along the second shaft and thus, due to a helical gearing effect, compensates for play caused by a thermally induced change in the distance between the first shaft and the second shaft.

17 Claims, 3 Drawing Sheets

GEAR DRIVE

Priority Claim

This is a U.S. national stage of application No. PCT/EP00/04271, filed on May 11, 2000. Priority is claimed on that application and on the following application:

Country: Germany, Application No.: 199 28 960.3, Filed: Jun. 24, 1999. 3

BACKGROUND OF THE INVENTION

The invention pertains to a gear drive with at least a first gear wheel on a first shaft and a second gear wheel on a second shaft a certain distance away from the first shaft. The second gear wheel engages with the first gear wheel by way of helical gearing. A third gear wheel is provided a certain axial distance away from the second gear wheel to compensate for backlash. The third wheel also engages with the first gear wheel by way of helical gearing and can be shifted axially with respect to the second gear wheel.

For a gear drive between two shafts, the distance between the shafts should be planned so that the backlash is neither too large nor too small, because otherwise the gear wheels will either jam or chatter. Especially in the case of shafts with high threshold torques or alternating torques such as the crankshafts of internal combustion engines, the teeth of the meshing gears of a secondary drive must be of high quality and have minimal backlash, because otherwise running noise will be produced by the change from one set of contact surfaces to the other in the area where the teeth mesh. This problem is exacerbated by differences between the thermal expansion of the materials of the gear wheels, which are usually fabricated of steel, and the thermal expansion of the shaft housing, which, in the case of internal combustion engines, is produced out of, for example, aluminum. The difference with respect to thermal expansion causes a change in the distance between the shafts and therefore a change in the backlash. This can be disadvantageous because of the noise which is produced while the internal combustion engine is warming up.

A gear stage with backlash elimination is known from DE 4,326,155 A1. To compensate for changes in backlash, a gear wheel can be shifted in the axial direction. A piston-cylinder arrangement is used to shift the gear wheel hydraulically. A system for compensating in this way for the changes in backlash caused by thermal expansion, however, is complicated in operation and expensive to produce.

SUMMARY OF THE INVENTIONS

The present invention is based on the task of providing a gear drive of the type indicated above which overcomes the disadvantages described above and which can easily and precisely compensate for the changes in backlash caused by differences in the thermal expansion of the gear wheels and the gear wheel housing.

It is therefore provided according to the invention that an expansion element is used to adjust the distance between the second and the third gear wheels as a function of temperature. The thermal expansion behavior of this expansion element is selected so that, when the expansion element undergoes thermal expansion, it will shift the third gear wheel in the axial direction and thus, under consideration of a helical gearing effect, compensate for the play caused by the thermally induced change in the distance between the first and the second shafts.

This has the advantage that, once the predetermined amount of backlash has been set, it will remain constant despite changes in temperature, because the effect of temperature itself brings about the required compensation automatically, without the need for any complicated hydraulic control. When the design according to the invention is used, it is possible for the gear teeth to have relatively small helix angles, which means that high torsional strength is obtained when the teeth are meshing without backlash.

It is advisable for the third gear wheel to be seated on the second shaft by sets of spur teeth, for example, so that it is able to shift in the axial direction. As an alternative, the sliding seat between the second shaft and third gear wheel can be designed with helical teeth, which improves the compensation of the temperature-caused change in backlash.

In a preferred embodiment, the elastic means is a disk spring, and the second shaft is advisably threaded, so that a nut can be screwed onto it. Thus the disk spring can be held in place between the nut and the third gear wheel.

The expansion element can be designed as an expansion ring, for example.

In a preferred embodiment, an elastic means is provided, which acts on the third gear wheel, pushing it axially in the direction of the second gear wheel. The expansion element expands to compensate for changes in backlash in opposition to the force exerted by this elastic means.

In an alternative, preferred embodiment, the second shaft is designed as a hollow shaft, and the expansion element is mounted in the hollow shaft, the hub of the third gear wheel being supported radially in the hollow shaft with play.

In a preferred elaboration of the invention, an expansion rod is connected detachably to the second shaft by a collar. The collar can be provided with several slots, for example, and can be held in place on the second shaft by a screw with a conical clamping section.

It is advisable for the two gear wheels to be mounted at different ends of the second shaft and to mesh with two individual gear wheels of the first shaft.

To save space and to reduce the number of parts, at least one of the two gear wheels of the first shaft is designed as a sensor wheel for an engine control system. It is advisable for the gear wheel of the first shaft serving as the sensor wheel to have at least one missing tooth.

BRIEF DESCRIPTION OF THE DRAWINGS

Additional features, advantages, and advantageous designs of the invention can be derived from the following description of the invention, which is based on the attached drawings.

DETAILED DESCRIPTION OF THE PREFERRED EMBODIMENTS

Figure 1:
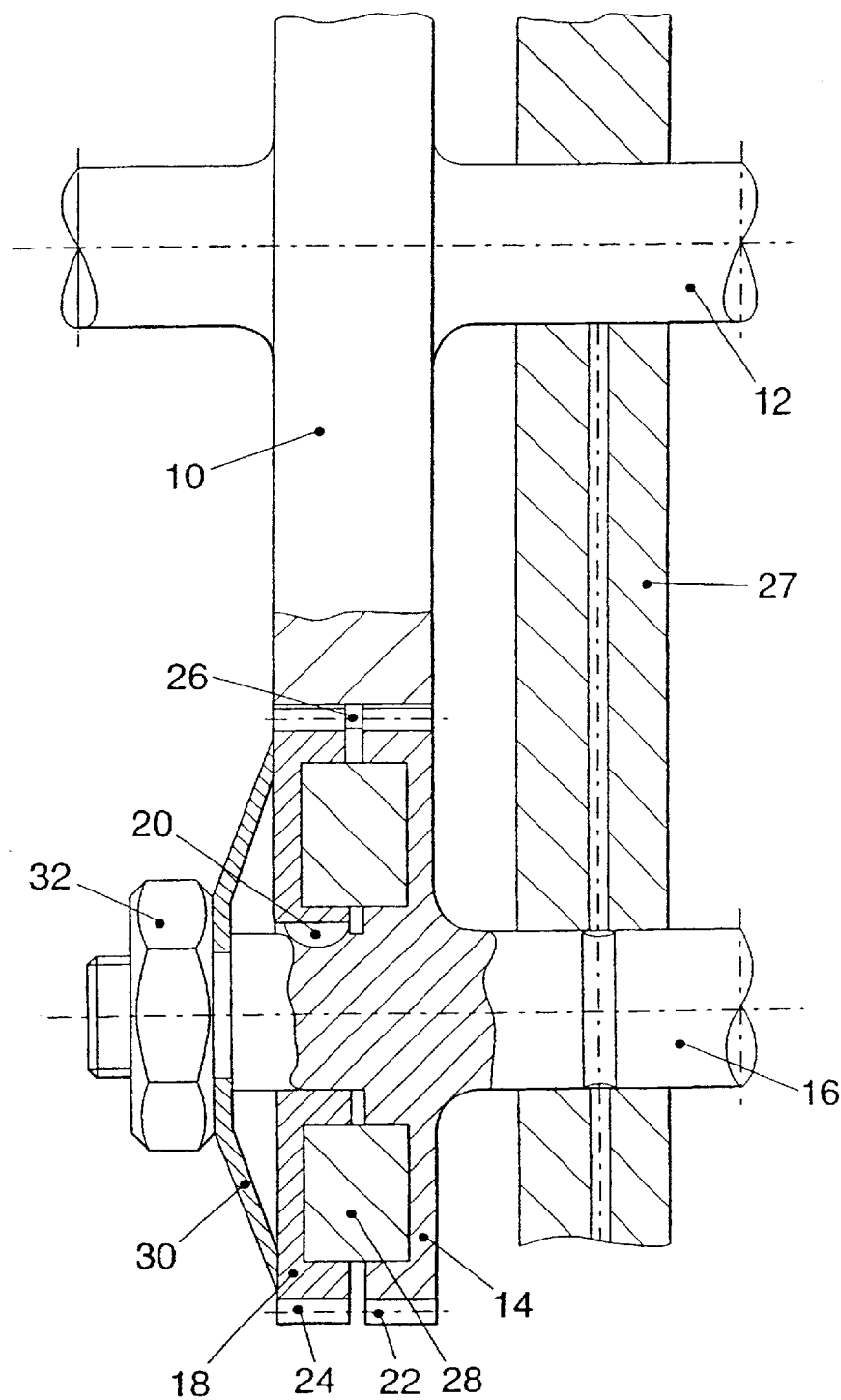
FIG. 1 is a schematic sectional view of a first preferred embodiment of a gear drive according to the invention.

The preferred embodiment of a gear drive according to the invention illustrated in FIG. 1 comprises a first gear wheel 10 on a first shaft 12, a second gear wheel 14 on a second shaft 16, and a third gear wheel 18, which is also on the second shaft 16 a certain axial distance away from the second gear wheel 14, and which has a sliding seat 20 so that it can be shifted in the axial direction along the second shaft 16. The two gear wheels 14, 18 have helical gearing 22, 24, by which they mesh with corresponding helical gearing 26 on the first gear wheel 10. The shafts 12, 16 are supported in a housing 27.

An expansion ring 28 is mounted between the second gear wheel 14 and the third gear wheel 18 so that it is in axial contact with both of them. In addition, a disk spring 30 is pushed onto the second shaft 16; this spring exerts a defined amount of pretension on the third gear wheel 18 and is held in place by a nut 32, which is screwed onto the second shaft 16.

The disk spring 30 ensures that the expansion ring 28 remains in clearance-free axial contact with the gear wheels 14, 18 under all operating conditions.

The coefficient of thermal expansion of the expansion ring 28 is different from that of the gear wheels 14, 18; this coefficient is selected so that the relative change in the distance between the shaft 12 and the shaft 16 caused by heat is compensated under consideration of the helical gearing effect. Once the backlash has been set in a design of this type, it remains constant, regardless of the temperature. To improve the correcting effect of the expansion ring 28, the sliding seat 20 between the third gear wheel 18 and the second shaft 16 can be provided with helical teeth instead of spur teeth.

Figure 2:
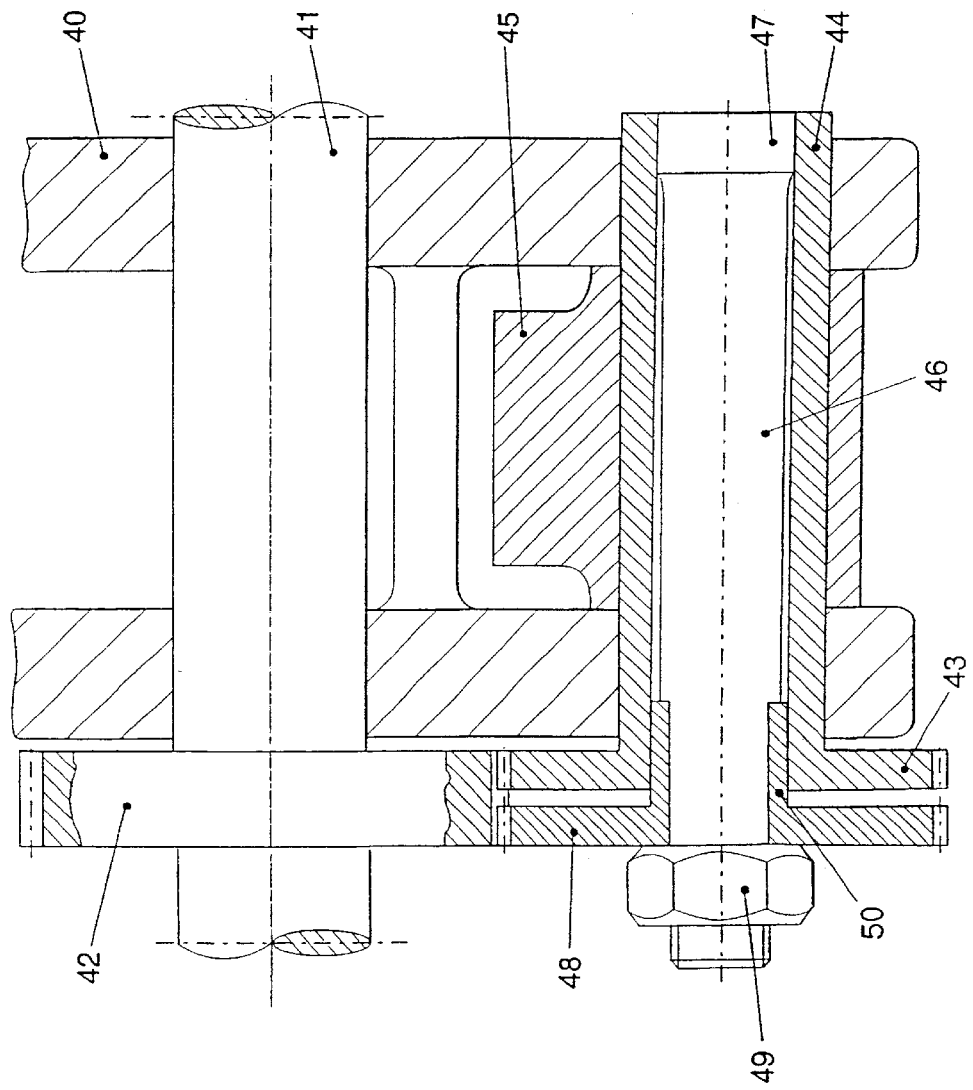
FIG. 2 is a schematic sectional view of a second preferred embodiment of a gear drive according to the invention.

In the preferred, alternative embodiment of a gear drive according to the invention shown in FIG. 2, a shaft 41, such as the crankshaft of an internal combustible engine, is supported in a machine housing 40. With its gear wheel 42, this shaft 41 drives the flyweight 45 of a mass-balancing device by way of a gear wheel 43 and a hollow shaft 44. By taking advantage of the length of the hollow shaft 44, an expansion element 46 is held in place in the shaft in a friction-locking manner by way of its collar 47.

Figure 3:
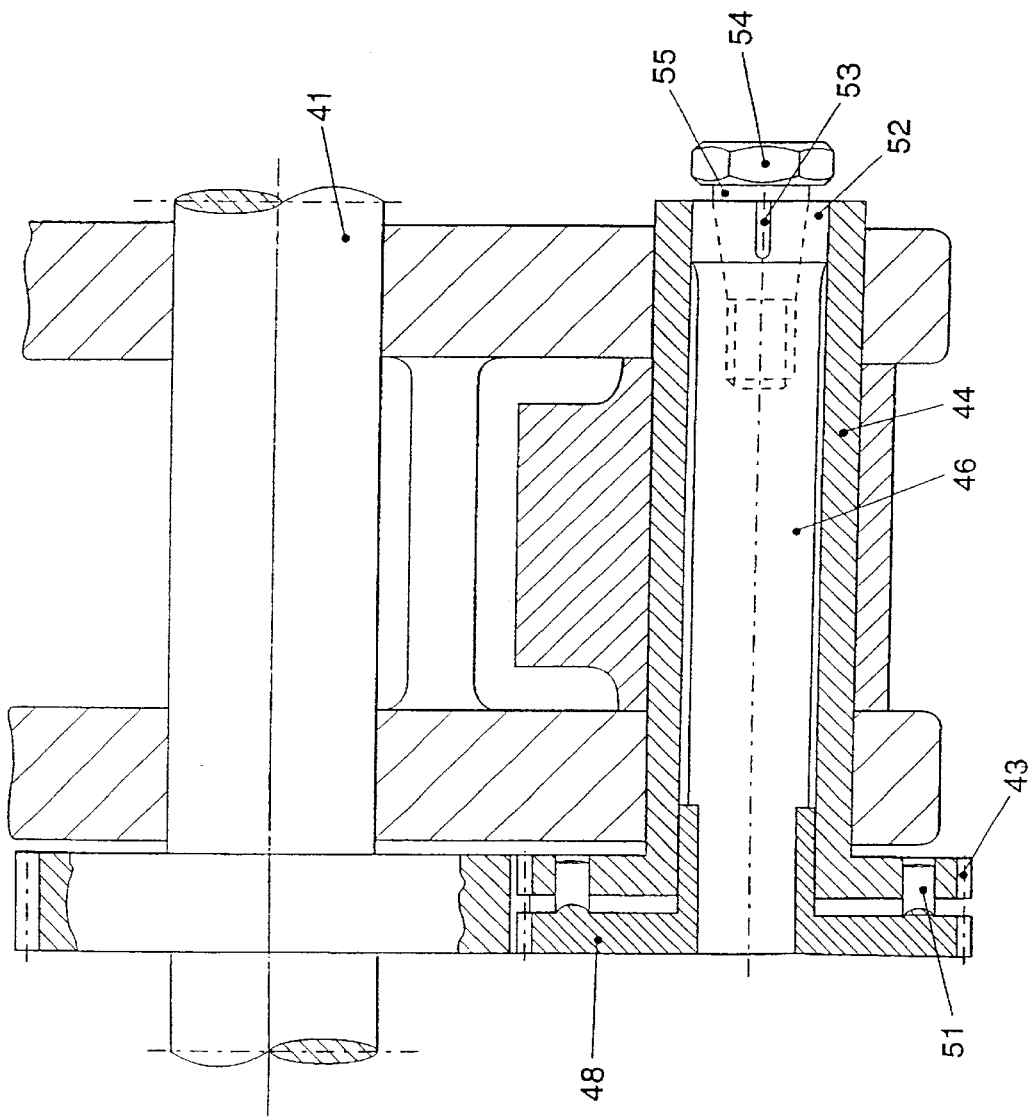
FIG. 3 is a schematic sectional view of a third preferred embodiment of a gear drive according to the invention.

FIG. 3 shows another alternative embodiment of a gear drive according to the invention, which makes it possible to correct production-related differences in the distance between the shaft 41 and the hollow shaft 44 and thus to compensate for the resulting effect on the backlash of the meshing gear wheels 42, 43. For this purpose, the two gear wheels 43, 48 are connected to each other by way of stud connections 51 so that they remain free to move axially with respect to each other. The gear wheel 48 is seated firmly on the expansion rod 46 by shrink-fitting.

In this embodiment, the collar 52 of the expansion rod 46 is not brought into clamping connection with the hollow shaft 46 until after the gear wheels have been installed. Only after the gear wheel 48 has been mounted in its proper axial position, i.e., the position corresponding to the basic backlash adjustment, a screw 54 with a conical clamping section 55 is tightened. Several slots 53 around the circumference of the collar 52 facilitate the clamping process. Starting from this basic backlash adjustment, the expansion rod 46 then compensates for the heat-induced changes in the backlash.

The invention makes it possible to keep the backlash between the gear wheels 42 and 43 and that between the gear wheels 10 and 14 effectively constant at all operating temperatures. Differences in the individual parts related to manufacturing tolerances can be also corrected by the basic backlash adjustment.

Alternatively, the two gear wheels 43, 48 can be mounted at different ends of the hollow shaft 44, in which case an additional gear wheel would be mounted on the shaft 41. This design is preferred when, for example, because the arm of the crank is too short, there is not enough room available on the crankshaft 41 to accept the relatively wide gear wheel 42. In this case, two narrower gear wheels can be provided, which are mounted on two different crank arms a certain distance apart, so that they can mesh with the gear wheels 43, 48 at the ends the hollow shaft 44. To make up for the extra work required to realize this alternative, it is possible for the additional gear wheel on the crankshaft to serve as a sensor wheel, for example, which cooperates with an electronic engine control system. In this case, one or two teeth will be missing from the wheel so that the location of TDC [Top Dead Center] can be identified. The absence of one or two teeth is not a disadvantage in a gear drive with two gear wheels.

What is claimed is:

1. A gear drive, comprising: a first shaft; a first gear wheel on the first shaft; a second shaft a certain distance away from the first shaft; a second gear on the second shaft, the second gear wheel engaging with the first gear wheel by way of helical gearing; a third gear wheel mounted on the second shaft a certain axial distance away from the second gear wheel to compensate for backlash, the third gear wheel also engaging with the first gear wheel by way of helical gearing and being axially shiftable with respect to the second gear wheel; and an expansion element arranged so as to change a distance between the second gear wheel and the third gear wheel as a function of temperature, the expansion element having a thermal expansion selected so that, when the expansion element undergoes thermal expansion, the expansion element shifts the third gear wheel in an axial direction along the second shaft and thus, due to a helical gearing effect, compensates for play caused by a thermally induced change in the distance between the first shaft and the second shaft.

2. A gear drive according to claim 1, and further comprising a sliding seat arranged to mount the third gear wheel on the second shaft so that the third wheel can move in the axial direction.

3. A gear drive according to claim 2, wherein the sliding seat has spur teeth.

4. A gear drive according to claim 2, wherein the sliding seat has helical teeth.

5. A gear drive according to claim 1, wherein the expansion element is an expansion ring.

6. A gear drive according to claim 1, wherein the expansion element is an expansion rod.

7. A gear drive according to claim 1, and further comprising elastic means for exerting force on the third gear wheel so as to push the third gear wheel in the axial direction toward the second gear wheel.

8. A gear drive according to claim 7, wherein the expansion element is configured to expand to compensate for backlash in opposition to the force of the elastic means.

9. A gear drive according to claim 7, wherein the elastic means includes a disk spring.

10. A gear drive according to claim 1, wherein the second shaft is a hollow shaft, and the expansion element is mounted in the hollow shaft.

11. A gear drive according to claim 10, wherein the third gear wheel has a hub supported radially in the hollow shaft with play.

12. A gear drive according to claim 6, wherein the expansion rod has a collar that connects the expansion d to the second shaft.

13. A gear drive according to claim 12, wherein the connection established by the collar between the expansion rod and the hollow shaft is detachable.

14. A gear drive according to claim 12, wherein the collar has a plurality of slots and further comprising a screw with a conical clamping section arranged to hold the collar in place on the second shaft.

15. A gear drive according to claim 1 wherein a further gear wheel is provided on the first shaft, the second and third gear wheels being mounted on opposite ends of the second shaft so as to respectively mesh with the two gear wheels of the first shaft.

16. A gear drive according to claim 15, wherein at least one of the two gear wheels of the first shaft is a sensor wheel for an engine control system.

17. A gear drive according to claim 16, wherein the gear wheel of the first shaft designed as the sensor wheel has at least one missing tooth.

* * * * *